United States Patent
Wei et al.

(10) Patent No.: US 11,316,919 B1
(45) Date of Patent: Apr. 26, 2022

(54) DATA FILE REPLICATION OF EDGE SERVERS

(71) Applicant: Citrix Systems, Inc., Fort Lauderdale, FL (US)

(72) Inventors: Daowen Wei, Nanjing (CN); Hengbo Wang, Nanjing (CN); Jian Ding, Nanjing (CN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 17/072,189

(22) Filed: Oct. 16, 2020

Related U.S. Application Data

(63) Continuation of application No. PCT/CN2020/119992, filed on Oct. 9, 2020.

(51) Int. Cl.

| | |
|---|---|
| *G06F 15/16* | (2006.01) |
| *H04L 67/1095* | (2022.01) |
| *G06F 11/30* | (2006.01) |
| *H04L 67/06* | (2022.01) |
| *G06N 7/00* | (2006.01) |
| *G06F 11/34* | (2006.01) |

(52) U.S. Cl.
CPC ...... *H04L 67/1095* (2013.01); *G06F 11/3006* (2013.01); *G06F 11/3495* (2013.01); *G06N 7/005* (2013.01); *H04L 67/06* (2013.01)

(58) Field of Classification Search
CPC .. H04L 67/1095; H04L 67/06; G06F 11/3495; G06F 11/3006; G06N 7/005
See application file for complete search history.

(56) References Cited

U.S. PATENT DOCUMENTS

| | | |
|---|---|---|
| 9,824,094 B1 | 11/2017 | Meyer et al. |
| 10,666,701 B2 | 5/2020 | Kagan et al. |
| 2003/0074379 A1 | 4/2003 | Keohane et al. |
| 2015/0127780 A1* | 5/2015 | Hardy ............ H04N 21/262 709/219 |
| 2018/0332092 A1 | 11/2018 | Kaplinger et al. |

FOREIGN PATENT DOCUMENTS

| | | | |
|---|---|---|---|
| CN | 110620828 | * | 7/2019 |
| CN | 110620828 A | | 12/2019 |
| JP | 2014127013 A | * | 7/2014 |

OTHER PUBLICATIONS

Written Opinion and Search Report dated Jul. 19, 2021 for Application No. PCT/CN2020/119992 filed Oct. 9, 2020; p. 9.

* cited by examiner

*Primary Examiner* — Anh Nguyen
(74) *Attorney, Agent, or Firm* — Hoffman Warnick LLC

(57) ABSTRACT

A system and method of providing early replication of files to edge devices during a file share operation. A system is provided that is configured to receive a file on behalf of a network of devices, the network of devices including the computing device and is configured to store the file. The device is further configured to identify an edge device based on previous file downloads for a given pair of users, the edge device configured to enable download of a copy of the file to an endpoint device; and provide the copy of the file to the edge device before receipt of a request by the edge device from the endpoint device to download the copy of the file.

17 Claims, 10 Drawing Sheets

| ID | GUID | Sender | Recipient | Sender IP | Date Time |
|---|---|---|---|---|---|
| 1 | bacc1d26-5db8-48f5-a6a9-8253d61aa25e | tom@sf.com | jerry@sf.com | 11.157.37.26 | 5/6/2020 9:30:06 AM |
| 2 | f442a60d-dccb-4d3a-8b5d-84f469e4162a | tom@sf.com | donald@sf.com | 11.156.28.62 | 5/7/2020 9:36:10 AM |
| 3 | 360b290b-87c5-4ebf-a81f-b57d712ed8e6 | tom@sf.com | donald@sf.com | 11.156.28.36 | 5/8/2020 10:07:11 AM |
| 4 | b05a9165-4f0b-4efe-8044-901d3308b9ad | tom@sf.com | donald@sf.com | 11.156.28.102 | 5/9/2020 10:08:26 AM |
| 5 | 8f423daf-23ba-4499-8fcf-dd8ee9b967cb | jerry@sf.com | donald@sf.com | 11.156.28.102 | 5/10/2020 10:14:43 AM |
| 6 | 8f423daf-23ba-4499-8fcf-dd8ee9b967cb | jerry@sf.com | betty@sf.com | 11.156.28.47 | 5/10/2020 11:02:37 AM |
| 7 | 8f423daf-23ba-4499-8fcf-dd8ee9b967cb | jerry@sf.com | tom@sf.com | 11.156.28.47 | 5/11/2020 1:02:37 PM |
| 8 | 16af78be-2fc2-498a-8389-6bbc903611a8 | tom@sf.com | donald@sf.com | 11.156.28.62 | 5/16/2020 1:06:42 PM |
| 9 | f87be33c-55e7-437f-9363-d2bc70510463 | alice@sf.com | anonymous@sf.com | 11.156.21.23 | 5/16/2020 5:06:21 PM |

Figure 2

| recipient | sender | server IP | count | transmitted time |
|---|---|---|---|---|
| terry@sf.com | tom@sf.com | 11.157.37.26 | 3 | 2020/5/17 |
| | tom@sf.com | 11.156.28.62 | 6 | 2020/5/17 |
| donald@sf.com | | 11.156.28.102 | 12 | 2020/5/17 |
| | jerry@sf.com | 11.156.28.62 | 21 | 2020/5/17 |
| | | 11.156.28.102 | 1 | 2020/5/17 |
| | betty@sf.com | 11.156.28.60 | 2 | 2020/5/17 |
| betty@sf.com | tom@sf.com | 11.156.28.102 | 3 | 2020/5/17 |
| | terry@sf.com | 11.156.28.62 | 16 | 2020/5/17 |
| tom@sf.com | jerry@sf.com | 11.157.23.29 | 5 | 2020/5/17 |
| anonymous@sf.com | tom@sf.com | 11.157.37.26 | 4 | 2020/5/17 |
| | alice@sf.com | 11.157.37.16 | 3 | 2020/5/17 |

Figure 3

| recipient | sender | server IP | forecast value |
|---|---|---|---|
| jerry@sf.com | tom@sf.com | 11.157.37.26 | 3 |
| | tom@sf.com | 11.156.28.62 | 9.1 |
| donald@sf.com | | 11.156.28.102 | 13.6 |
| | jerry@sf.com | 11.156.28.62 | 19.2 |
| | | 11.156.28.102 | 0.8 |
| | betty@sf.com | 11.156.39.60 | 4.5 |
| betty@sf.com | tom@sf.com | 11.156.28.62 | 3 |
| tim@sf.com | jerry@sf.com | 11.157.23.29 | 18 |
| | tom@sf.com | 11.157.37.26 | 7.5 |
| anonymous@sf.com | alice@sf.com | 11.157.37.26 | 3.2 |
| | | | 1.6 |

Figure 4

DATA FILE REPLICATION OF EDGE SERVERS

BACKGROUND OF THE DISCLOSURE

There are numerous service providers offering cloud storage that allow files to be uploaded, synched across devices, backed up, and shared with other users. Existing solutions, such as SHAREFILE® or DROPBOX® integrate seamlessly with platforms such as WINDOWS®, and allow users to exchange data anytime, from anywhere, and from any endpoint device.

In a typical file share operation, a first user uploads a file to the service via a first endpoint device and specifies one or more users that are permitted to download the file. The service stores and replicates the file amongst a set of servers in a distributed storage system. Thereafter, when a second user wants access to the file, the second user utilizes a second endpoint device to interface with the distributed storage system or an edge server near the second user, to obtain a copy of the file from the storage system.

BRIEF DESCRIPTION OF THE DISCLOSURE

Aspects of this disclosure provide a system and method for forecasting one or more edge servers that are predicted to be utilized for a file download, and replicating copies of the file at the edge server(s) before a download request is received.

A first aspect of the disclosure provides a computing device, comprising a memory and a processor coupled to the memory. The device is configured to receive a file on behalf of a network of devices, the network of devices including the computing device and is configured to store the file. The device is further configured to identify an edge device based on previous file downloads for a given pair of users, the edge device configured to enable download of a copy of the file to an endpoint device; and provide the copy of the file to the edge device before receipt of a request by the edge device from the endpoint device to download the copy of the file.

A second aspect of the disclosure provides a computerized method of processing shared files, including receiving a file on behalf of a network of devices, the network of devices including the computing device and configured to store the file. The method further includes identifying an edge device based on previous file downloads for a given pair of users, the edge device configured to enable download of a copy of the file to an endpoint device; and providing the copy of the file to the edge device before receipt of a request by the edge device from the endpoint device to download the copy of the file.

A third aspect of the disclosure provides a file sharing service, having a memory and a processor coupled to the memory and configured to process shared files in a distributed storage system according to a method. The method includes detecting an upload of a file from a first endpoint device into the distributed storage system. The method further includes identifying at least one edge device outside of the distributed storage system predicted to service a download request using a prediction model; and instructing the distributed storage system to replicate the file onto the at least one edge device before the download request is received.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 2 depicts sender-recipient download records, in accordance with an illustrative embodiment.

FIG. 3 depicts sender-recipient download records showing download counts, in accordance with an illustrative embodiment.

FIG. 4 depicts a prediction model, in accordance with an illustrative embodiment.

The drawings are intended to depict only typical aspects of the disclosure, and therefore should not be considered as limiting the scope of the disclosure.

DETAILED DESCRIPTION OF THE DISCLOSURE

Embodiments of the disclosure include technical solutions for improving download times associated with downloading shared files from a network of devices, such as that provided by a file sharing service using a distributed storage system. As is common practice, when a file is uploaded to a distributed storage system for sharing by a first user, the file is replicated over a handful of servers within the storage system, either using full copies or partial copies with erasure coding to recreate the file. Thereafter, when a second user wants to download the file, the user's endpoint device interacts with a nearby edge device (e.g., a server or other network device) that receives the file from the storage system and downloads the file to the user's endpoint device. Once downloaded to an edge device, the file may be cached at the edge device in order speed up subsequent downloads. However, because a file is typically only downloaded once by the second user, caching often does little to improve the overall user experience. Instead, users are most concerned about the download speed the first time a file is downloaded, which can suffer from undesirable latency, e.g., when the edge device must interface with a potentially distant server in the storage system.

A technical solution is herein provided in which one or more target edge devices are forecasted as the likely download locations when a file is uploaded for sharing. Once forecasted, the file may be "pre-loaded" (i.e., replicated) onto such target edge devices before any download is requested. If a download request thereafter occurs at a target edge device, download times will be significantly reduced, thereby improving download speeds and the overall user experience.

Figure 1:
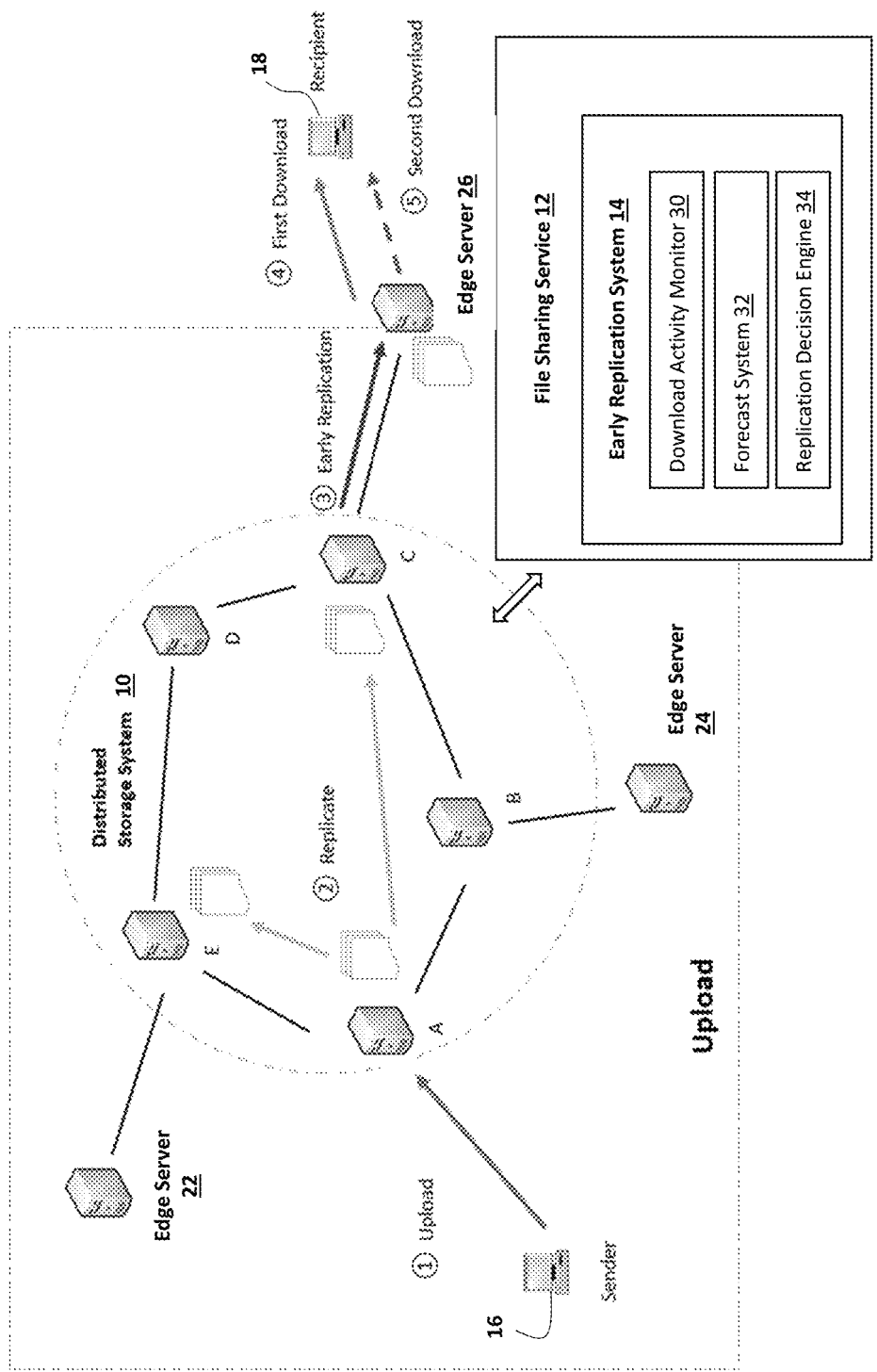
FIG. 1 depicts an illustrative content distribution network, in accordance with an illustrative embodiment.

FIG. 1 depicts an illustrative content delivery network that includes a distributed storage system 10, such as a cloud, and a filing sharing service 12, which allows for the exchange of content among endpoint devices. In the example shown, distributed storage system 10 includes servers A, B, C, D and E configured to store content. A further set of edge servers 22, 24, and 26, reside outside the distributed storage system 10 and provide potential entry points for endpoint devices, such as desktops, laptops, smartphones, smart devices, etc. Edge servers 22, 24, and 26 are often deployed to, for example, reduce the workload on the storage system 10 servers and reduce latency for end users.

In this embodiment, file sharing service 12 includes an early replication system 14 that forecasts which edge servers are likely to be used to download content during file share operations. Once forecasted, early replication system 14 replicates uploaded content onto one or more edge servers 22, 24, 26. An example of this process is shown in FIG. 1. First (1), a sender 16 at a first endpoint device uploads a file directly to the distributed storage system 10, which then stores copies of the file (2) by replicating the file (or parts of the file with erasure coding) to a subset of the servers A, C and E. In this case, the file is intended to be shared with a recipient 18 using a second endpoint device. At this point, early replication system 14 determines which edge server will likely be used to download the file, in this case edge server 26, and then performs an "early replication" of the file (3) on edge server 26. When the recipient 18 attempts to first download the file (4), the file is already resident on the edge server 26, so latency is significantly reduced. The file can remain (i.e., be cached) on the edge server 26 to also reduce latency on a second (5) or any subsequent downloads.

Early replication system 14 generally includes: (1) a download activity monitor 30 that monitors download activities in edge servers and captures metadata associated with the download activity; (2) a forecast system 32 that assigns forecast values to edge servers; and (3) a replication decision engine 34 that determines whether and where early replication to an edge server should occur. Note that while embodiments are described herein with reference to servers and a distributed storage system, it is understood that the concepts may be applied to any type of device network that utilizes edge devices to facilitate content sharing. Further, it is understood that the early replication system 14 may be implemented by one or more computing devices within the distributed storage system 10, by one or more computing devices outside of the distributed storage system 10, or by a combination of the two. It is also understood that early replication system 14 may be implemented within the file sharing service 12, or be implemented separately from the file sharing service 12.

FIG. 2 depicts an example of data, i.e., download records, collected by the download activity monitor 30. In this case, download activity monitor 30 collects metadata when a download occurs that includes an identification of the data file (GUID), a sender user name that uploaded the file, a recipient user name that downloaded the file, an IP address of the edge server used, and a download time. Download records may for example be collected via a payload message from the file sharing service 12 or directly from the distributed storage system 10.

Using the download records, forecast system 32 assigns forecast values to different edge servers for individual sender and recipient pair. As shown in FIG. 3, the forecast system 32 first groups download records by sender and recipient pairs, and for each day provides a count of the number of downloads at each server for each pair. As is evident, a given pair may have downloads at more than one edge server. Using count information, a forecast value to each server for each pair is assigned. Any of a variety of techniques or methodologies could be used, and one illustrative example includes an exponential moving average algorithm (EWMA) that gives greater weight to more recent samples. An illustrative EWMA is given by:

$$Y_n = \theta Y_{n-1} + (1-\theta)X_n$$

$$\theta = \min\left\{\alpha, \frac{1+C}{\beta+C}\right\}$$

$$\beta = \frac{1+T}{\alpha} - T$$

Where
1) T is the number of days in cold start phase, i.e., number of elapsed days prior to reaching a predetermined minimum (e.g., 20 days) required for forecasting accuracy. This allows the algorithm to make predictions during this start-up phase with some potential reduction in forecast accuracy.
2) C is the number of days since day one.
3) The coefficient $\alpha$ represents the degree of weighting decrease after cold start phase.
4) The coefficient $\beta$ represents the regulation factor for weighting decay in cold start phase.
5) The coefficient $\theta$ represents the max value between a and $$\frac{1+C}{\beta+C}.$$

6) $X_n$ is the value at a time period n, access frequency of a subsequent app in a day.
7) $Y_n$ is the value of EWMA at any time period n.
8) n is day index in sequence starting from 1.

This approach provides that the value of the moving average (Y) at day n is a mix between a value of raw signal (X) at day n and the previous value of the moving average itself. The degree of mixing is controlled by a hyper parameter, i.e., coefficient $\theta$, in the range of [0, 1]. If $\theta$ is a large value, most of the contribution come from previous values before current day, and vice versa. The lower the coefficient $\theta$ is, more sensitive the EWMA value is to the most recent change.

A bias variance may forecast values in a cold start phase due to not enough data samples (i.e., some predetermined minimum number of days not yet met). This approach uses a monotone increasing function to select daily different coefficients starting from about 0.5 for bias correction in a cold start phase. Finally, coefficient $\theta$ is set to a constant coefficient $\alpha$ after the cold start phase, e.g., 0.95. A coefficient of 0.95 means an active status forecast based on data samples over past 20 days.

FIG. 4 depicts a resulting prediction model in which a forecast value is assigned to individual recipient-sender pairs at different edge servers. The higher the forecast value, the more likely that the associated edge server will service a download request for the pair. For example, for file shares involving donald@sf.com and jerry@sf.com, edge server at IP address 11.156.28.62 has a forecast value of 19.2, while edge server at 11.156.28.102 only has a forecast value of 0.8. Accordingly, for file shares to donald@sf.com from jerry@sf.com, the edge server at IP address 11.156.28.62 is much more likely to be utilized than the edge server at 11.156.28.102.

Figure 5:
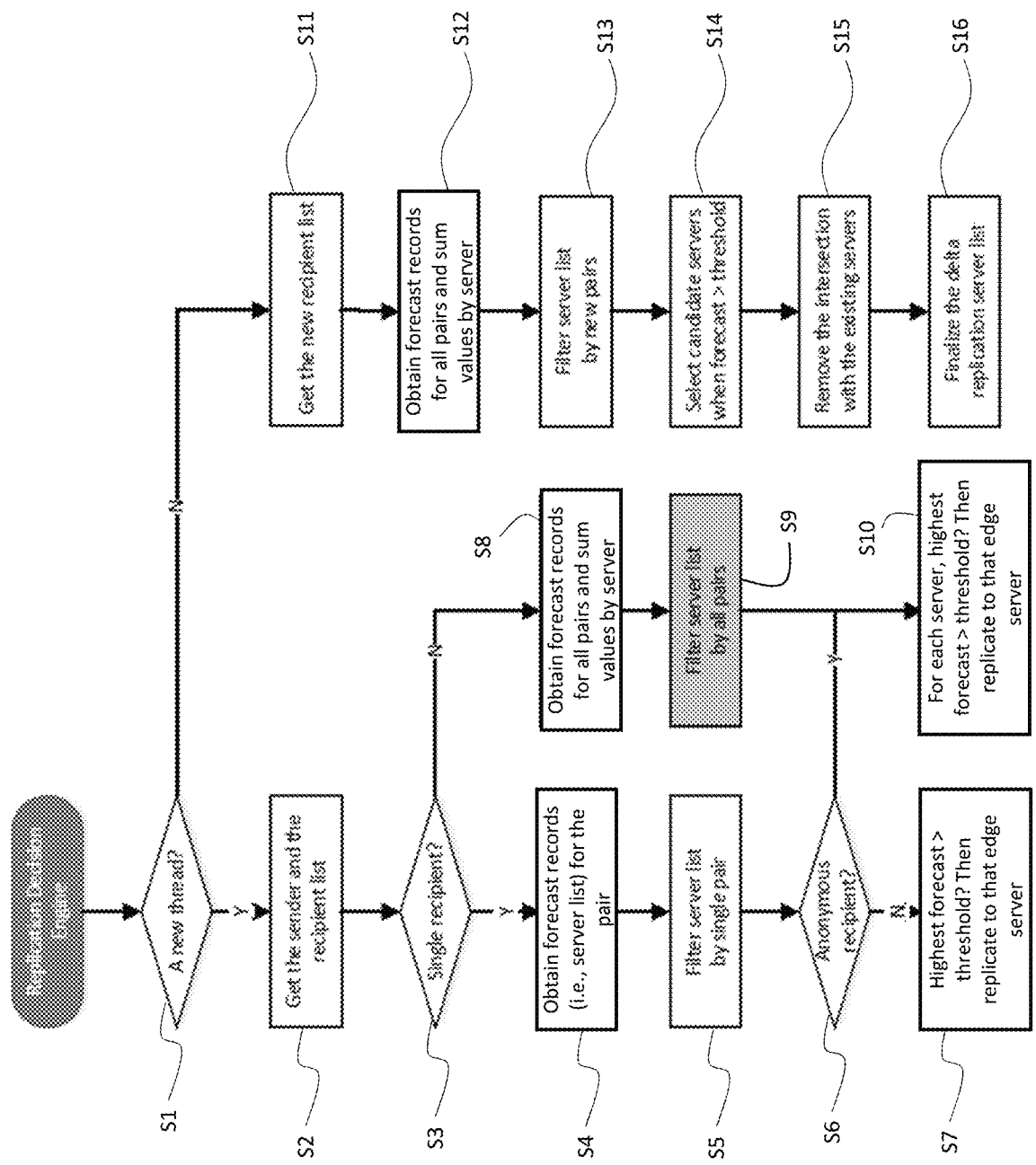
FIG. 5 depicts a process of implementing a replication decision engine, in accordance with an illustrative embodiment.

Once the forecast values are calculated, replication decision engine 34 determines if and where an early or otherwise predicted/forecasted replication should occur. An illustrative methodology of implementing the replication decision engine 34 is shown in FIG. 5 in which different strategies are adopted by the engine 34 to cover different file sharing scenarios. In this example, the replication decision engine 34 is notified, e.g., by the file share service 12, that a file sharing upload was received and at S1 a determination is made whether the file share operation involves is a new thread (e.g., a new file upload) or an existing thread (e.g., adding new recipients to an existing uploaded file). If the operation involves a new thread, then at S2, the sender and recipient list of download records (e.g., as shown in FIG. 2) is obtained. At S3, a determination is made whether the sharing operation involves a single recipient (i.e., peer-to-peer) or multiple recipients (i.e., a group share). In the case of a single recipient, forecast records are obtained for all servers previously used by the pair at S4, and at S5 the forecasts are filtered to sort and identify the record or records with the highest forecast value(s). Using sender tom@sf.com and recipient donald@sf.com as an example (FIG. 4), there are two edge servers (11.156.28.62 and 11.156.28.102) shown to be recently accessed. Assuming a threshold value of 8.0, and the forecast values are shown as 9.1 and 13.6 respectively, both exceed the threshold. Since this does not involve an anonymous recipient and the forecast values of both edge servers are greater than the threshold, both servers are candidates to be replicated. If recipient is an anonymous user, only the top server is selected by forecast value. For instance, 11.156.28.102 with a 13.6 forecast value would be selected for replication.

At S6 a determination is made whether the recipient is an anonymous recipient. In this illustrative approach, it is assumed all anonymous downloads are triggered using a special user account such as anonymous@sf.com. Accordingly, the process does not care who the real recipient user is since it is unknown as to who downloaded the data in anonymous mode.

If no at S6, then the server with the highest forecast value for the pair is selected to receive a replicate of the file if the forecast value exceeds a threshold (e.g., a predetermined threshold). Accordingly, when a user initiates a peer-to-peer sharing, the replication decision engine first filters the forecast records by sender and recipient pair to identify an edge server having the highest forecast value for the pair (e.g., 19.2 for donald@sf.com and jerry@sf.com). It then compares the forecast value with a threshold, which can be selected in any manner, e.g., to ensure a balance between replication cost and likelihood of download. Historical cost and download information may be utilized to select and/or periodically adjust the threshold. For example, a threshold can be selected to achieve a target download rate from forecasted replication servers of between 70-75% based on historical analysis, which would justify the additional cost. A threshold selected too low would generally result in a download rate less than 70% of the time, while a threshold selected too high would result in a download rate greater than 75% of the time.

If the forecast is above the threshold, the file is replicated to the edge server. Using donald@sf.com and jerry@sf.com as a peer-to-peer sharing example, donald@sf.com downloads the data from three different servers, i.e., 11.156.28.62, 11.156.28.102, and 11.156.28.60 and their forecast values are 19.2, 0.8 and 4.5 respectively. If the threshold is 4, then both 11.156.28.62 and 11.156.28.60 can be selected. If the threshold is 6, only 11.156.28.62 is selected. This selection policy depends on the threshold value to filter out. In an alternative approach, the top N can be selected as candidates, regardless of the forecast value. For instance, always select just the top one, or the top two.

In a case where the file sharing involves a group share operation (i.e., no at S3), then the replication decision engine 34 obtains the forecast records (i.e., server list) for all pairs and sums the forecast values for individual servers at S8. The highest scoring server for a pair is identified at S9. Then, at S10, the forecast records by all sender and recipient pairs are evaluated to identify the highest forecast value for individual pairs. Then, it sums the forecast values by server and compares the sums to a further threshold. If the sum for a given edge server is above the further threshold, the file is replicated to the edge server. In this case, an edge server associated with each recipient in the group could receive an early replication, i.e., multiple edge servers could receive the replicated file. If the recipient is anonymous at S6, then the same logic is applied to the group share as is used to forecast edge servers for file replication.

In the event that at S1 the thread does not involve a new upload, but rather involves the addition of new recipients, the new recipient list is obtained at S11. At S12, the replication decision engine 34 obtains the forecast records (i.e., server list) for the pairs and sums the forecast values for individual servers. The highest scoring server for individual pairs is identified at S13 and at S14, and the forecast records by all sender and recipient pairs are evaluated to identify the highest forecast value for individual pairs. Then forecast values, server by server, are summed and the sums are compared to a threshold. At S15, an intersection with the existing servers is performed and at S16 a delta replication server list is generated. In this manner, the replication decision engine 34 first identifies the edge servers with the highest forecast value for the new recipients, and then removes the intersection with the existing edge servers. After the intersection removal, the engine 34 can replicate files to any newly identified servers.

For example, assume there is an existing thread involving sender tom@sf.com, and recipients donald@sf.com and jerry@sf.com, and a replication server list shows servers at 11.157.37.26, 11.156.28.62, 11.156.28.102 that are the existing replication edge servers for this group. Assume then that tom@sf.com adds a new recipient betty@sf.com into this existing group share. The process first selects the most likely edge server between Tom and Betty, e.g., 11.156.28.62. Next, the process checks if this most likely forecasted edge server accessed by the new user is already in the existing replication server list. If yes, then an intersection exists and no action is required (i.e., the intersection is removed). For instance, in the example, 11.156.28.62 is one of the existing replication servers, so no action is required. Otherwise, if the most likely forecasted server is not in the current list, data should be replicated to this server and the replication server list should be updated to include the new server (i.e., to create a delta replication server list).

Figure 6:
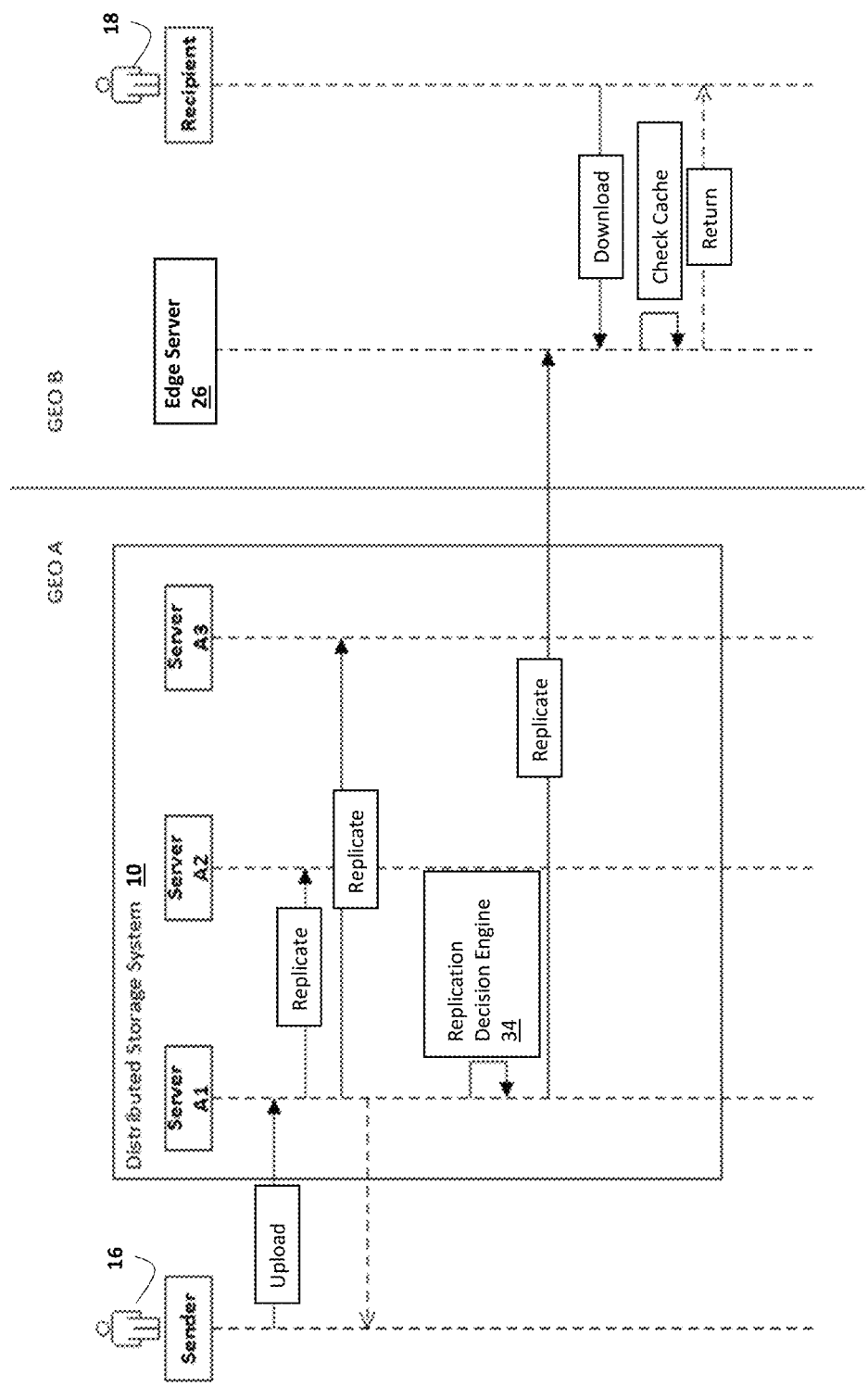
FIG. 6 depicts a process flow of a file share operation, in accordance with an illustrative embodiment.

FIG. 6 depicts a further diagram of a file share process flow between sender 16 (who resides in a first geographic location "GEO A") and recipient 18 (who resides in a second geographic location "GEO B"). As shown, the sender 16 uploads a file to the distributed storage system 10, and more particularly Server A1. The distributed storage system 10 then replicates the file to Servers A2 and A3. Replication decision engine 34 also determines whether the file should be replicated outside of the distributed storage system; in this case replication decision engine replicates the file to edge server 26. Recipient 18 then interfaces with edge server 26 to download the file, which has already been replicated thereon. The cache on edge server 26 can also be checked in the event the file had already been downloaded. The file is then returned to the recipient 18.

Figure 7:
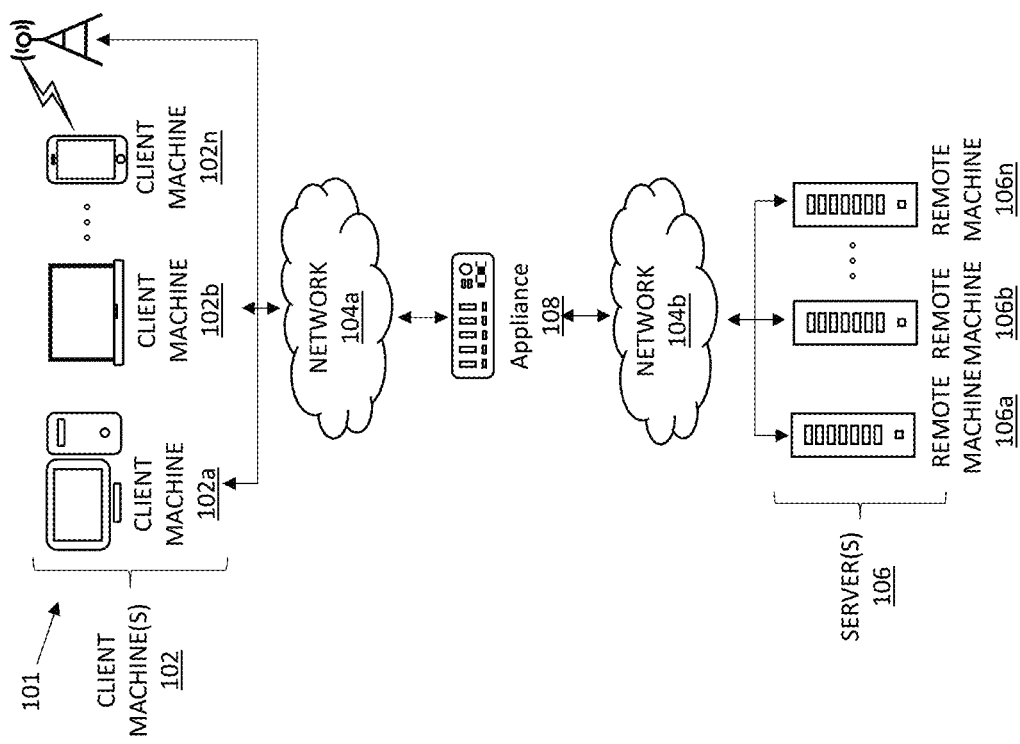
FIG. 7 depicts a network infrastructure, in accordance with an illustrative embodiment.

Referring to FIG. 7, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 8:
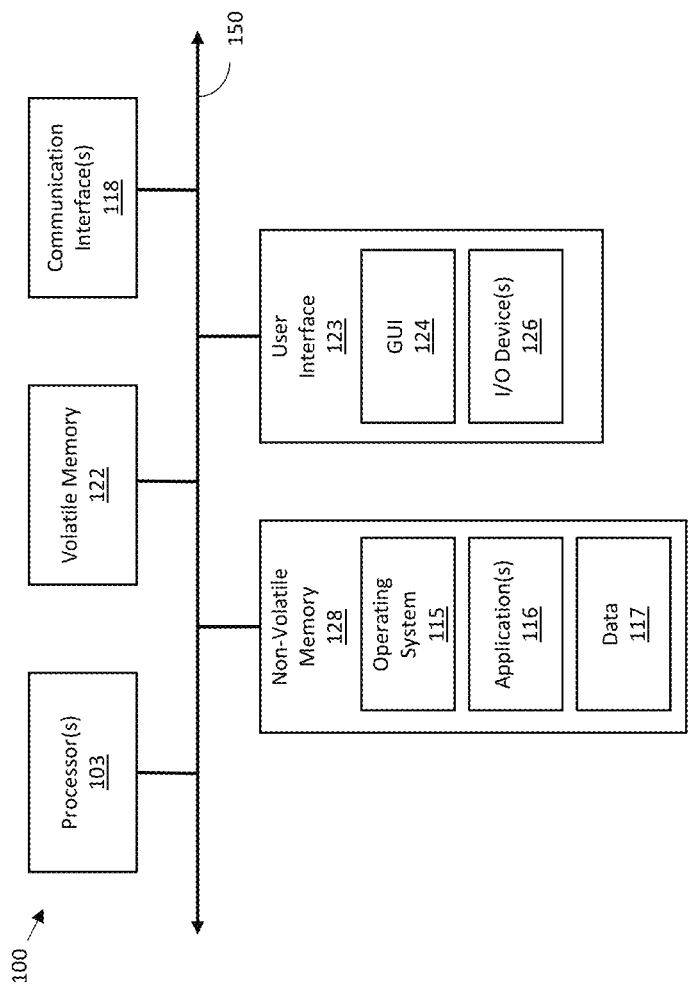
FIG. 8 depicts a computing system, in accordance with an illustrative embodiment.

FIG. 8 depicts a block diagram of a computing device 100 useful for practicing an embodiment of client devices 102, appliances 108 and/or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 103 may be analog, digital or mixed-signal. In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Figure 9:
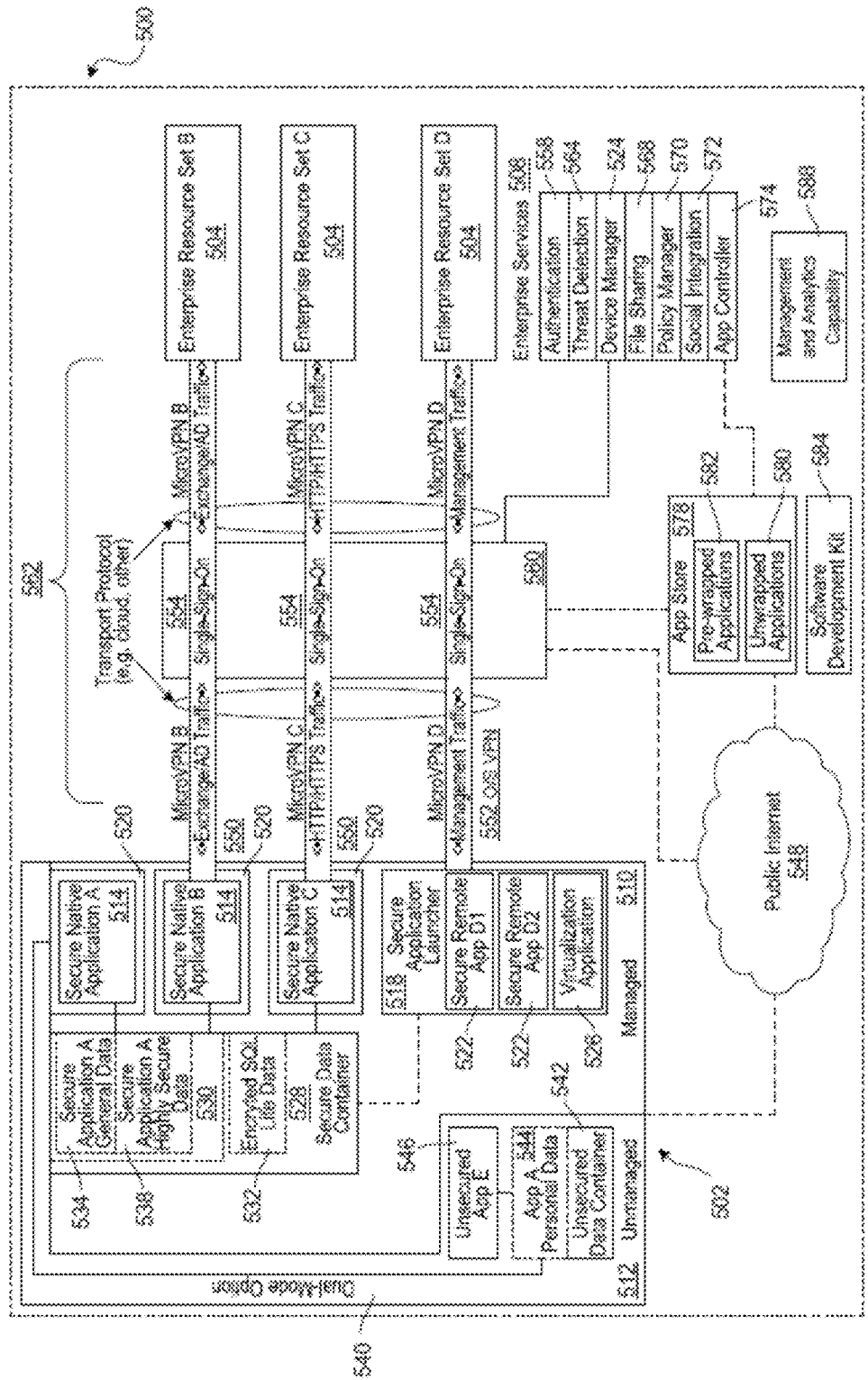
FIG. 9 depicts an illustrative enterprise mobility management system that may be used in accordance with one or more illustrative aspects described herein.
Figure 10:
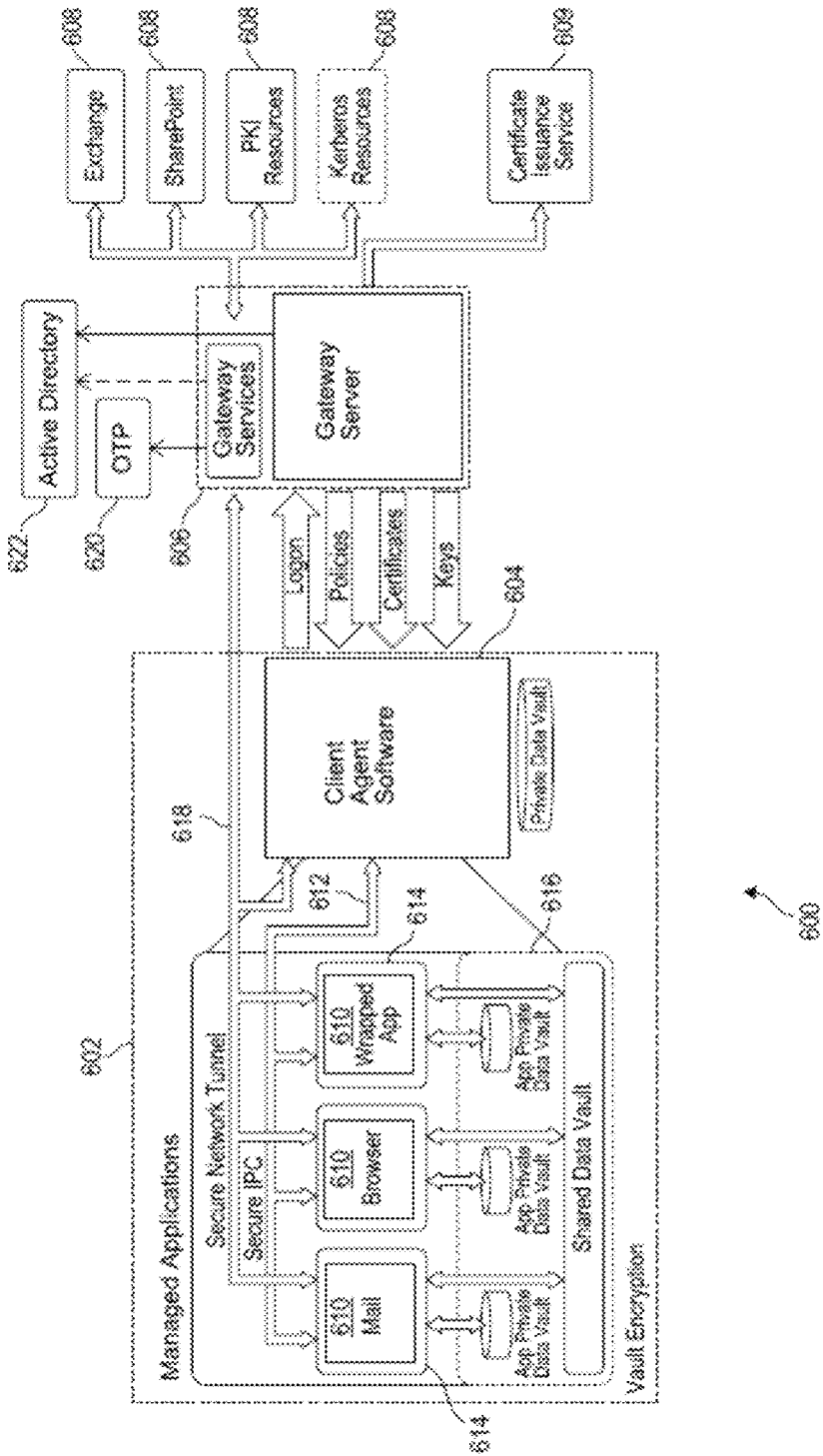
FIG. 10 depicts another illustrative enterprise mobility management system that may be used in accordance with one or more illustrative aspects described herein.

FIG. 9 represents enterprise mobility technical architecture 500 for use in a "Bring Your Own Device" (BYOD) environment. The architecture enables a user of mobile device 502 to both access enterprise or personal resources from mobile device 502 and use mobile device 502 for personal use. The user may access such enterprise resources 504 or enterprise services 508 using mobile device 502 that is purchased by the user or provided by the enterprise to the user. The user may utilize mobile device 502 for business use only or for both business and personal use. Mobile device 502 may run an iOS® operating system (Apple Inc. of Cupertino, Calif.), an Android® operating system (Google Inc. of Mountain View, Calif.), or the like. Although example embodiments are illustrated in terms of mobile device 502, a non-mobile device such as a desktop PC may also be used in lieu of mobile device 502. The enterprise may choose to implement policies to manage mobile device 502. The policies may be implemented through a firewall or gateway in such a way that mobile device 502 may be identified, secured or security verified, and provided with selective or full access to the enterprise resources (e.g., enterprise resources 504 and enterprise services 508). The policies may be mobile device management policies, mobile application management policies, mobile data management policies, or some combination of mobile device, application, and data management policies. Mobile device 502 that is managed through the application of mobile device management policies may be referred to as an enrolled device.

In some embodiments, the operating system of mobile device 502 may be separated into managed partition 510 and unmanaged partition 512. Managed partition 510 may have policies applied to it to secure the applications running on managed partition 510 and data stored in managed partition 510. The applications running on managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may include secure native applications 514, secure remote applications 522 executed by secure application launcher 518, virtualization applications 526 executed by secure application launcher 518, and the like. Secure native applications 514 may be wrapped by secure application wrapper 520. Secure application wrapper 520 may include integrated policies that are executed on mobile device 502 when secure native application 514 is executed on mobile device 502. Secure application wrapper 520 may include meta-data that points secure native application 514 running on mobile device 502 to the resources hosted at the enterprise (e.g., enterprise resources 504 and enterprise services 508) that secure native application 514 may require to complete the task requested upon execution of secure native application 514. Secure remote applications 522 may be executed within secure application launcher 518. Virtualization applications 526, executed by secure application launcher 518, may utilize resources on mobile device 502, enterprise resources 504, and the like. The resources used on mobile device 502 by virtualization applications 526 may include user interaction resources, processing resources, and the like. The user interaction resources may be used to collect and transmit keyboard input, touch screen input, touch pad input, mouse input, camera input, tactile input, audio input, visual input, gesture input, and the like. The processing resources may be used to present a user interface, process data received from enterprise resources 504, and the like. The resources used at enterprise resources 504 by virtualization applications 526 may include user interface generation resources, processing resources, and the like. The user interface generation resources may be used to assemble a user interface, modify a user interface, refresh a user interface, and the like. The processing resources may be used to create information, read information, update information, delete information, and the like. For example, virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on mobile device 502, this arrangement may also be elected for certain applications. For example, while some applications may be secured for use on mobile device 502, others might not be prepared or appropriate for deployment on mobile device 502 such that the enterprise may elect to provide the mobile user access to the unprepared applications through virtualization techniques. As another example, the enterprise may have large and complex applications with large and complex data sets (e.g., material resource planning applications) where it would be very difficult, or otherwise undesirable, to customize the application for mobile device 502 such that the enterprise may elect to provide access to the application through virtualization techniques. As yet another example, the enterprise may have an application that maintains highly secured data (e.g., human resources data, customer data, engineering data, etc.) that may be deemed by the enterprise as too sensitive for even the secured mobile environment such that the enterprise may elect to use virtualization techniques to only permit remote access to such applications and data. An enterprise may elect to provide both fully secured and fully functional applications on mobile device 502 as well as virtualization application 526 to allow access to applications that are deemed more properly operated on the server side. In some embodiments, virtualization application 526 may store some data, files, etc. on mobile device 502 in one of the secure storage locations. An enterprise, for example, may elect to allow certain information to be stored on mobile device 502 while not permitting other information.

In connection with virtualization application 526, as described herein, mobile device 502 may have virtualization application 526 that is designed to present GUIs and then record user interactions with the GUI. Virtualization application 526 may communicate the user interactions to the server side to be used by the server side application as user interactions with the application. In response, the application on the server side may transmit back to mobile device 502 an update to the GUI (e.g., a screen refresh). For example, the update to the GUI may include a static page, a dynamic page, an animation, or the like, thereby providing access to remotely located resources.

Secure applications 514 may access data stored in secure data container 528 in managed partition 510 of mobile device 502. The data secured in secure data container 528 may be accessed by secure native applications 514, secure remote applications 522 executed by secure application launcher 518, virtualization applications 526 executed by secure application launcher 518, and the like. The data stored in secure data container 528 may include files, databases, and the like. The data stored in secure data container 528 may include data restricted to a specific secure application (530), data shared among all secure applications (532), and the like. Shared data 532 may be stored in an encrypted SQLite database. Data restricted to a secure application (530) may include secure general data 534 and highly secure data 538. Secure general data 534 may use a strong form of encryption such as Advanced Encryption Standard (AES) 128-bit encryption or the like, while highly secure data 538 may use a very strong form of encryption such as AES 256-bit encryption. Data stored in secure data container 528 may be deleted from mobile device 502 upon receipt of a command from device manager 524. The secure applications (e.g., 514, 522, and 526) may have dual-mode option 540. Dual mode option 540 may present the user with an option to operate the secured application in an unsecured mode (also referred to as an unmanaged mode). In an unsecured mode, the secure applications may access data stored in unsecured data container 542 on unmanaged partition 512 of mobile device 502. Unsecured data container 542 may contain personal data 544. The data stored in unsecured data container 542 may also be accessed by unsecured applications 546 that are running on unmanaged partition 512 of mobile device 502. The data stored in unsecured data container 542 may remain on mobile device 502 when the data stored in secure data container 528 is deleted from mobile device 502. An enterprise may want to delete from mobile device 502 selected or all data, files, and/or applications owned, licensed or controlled by the enterprise (enterprise data) while leaving or otherwise preserving personal data, files, and/or applications owned, licensed, or controlled by the user (personal data). This operation may be referred to as a selective wipe. With the enterprise and personal data arranged in accordance to the aspects described herein, an enterprise may perform a selective wipe.

Mobile device 502 may connect to enterprise resources 504 and enterprise services 508 at an enterprise, through the public Internet 548, and the like. Alternatively, mobile device 502 may connect to enterprise resources 504 and enterprise services 508 through virtual private network connections. The virtual private network connections, also referred to as microVPN or application-specific VPN, may be specific to particular applications (as illustrated by microVPNs 550), particular devices, particular secured areas on the mobile device (as illustrated by O/S VPN 552), and the like. For example, each of wrapped applications 514 in the secured area of mobile device 502 may access enterprise resources 504 through application-specific VPN 550 such that access to the VPN would be granted based on attributes associated with the application, possibly in conjunction with user or device attribute information. The virtual private network connections may carry Microsoft Exchange traffic, Microsoft Active Directory traffic, Hypertext Transfer Protocol (HTTP) traffic, Hypertext Transfer Protocol Secure (HTTPS) traffic, application management traffic, and the like. The virtual private network connections may support and enable single sign-on (SSO) authentication processes 554. The single sign-on processes may allow a user to provide a single set of authentication credentials, which are then verified by authentication service 558. Authentication service 558 may then grant to the user access to multiple enterprise resources 504, without requiring the user to provide authentication credentials to each individual enterprise resource 504.

The virtual private network connections may be established and managed by access gateway 560. Access gateway 560 may include performance enhancement features that manage, accelerate, and improve the delivery of enterprise resources 504 to mobile device 502. Access gateway 560 may also re-route traffic from mobile device 502 to the public Internet 548, enabling mobile device 502 to access publicly available and unsecured applications that run on the public Internet 548. Mobile device 502 may connect to the access gateway via transport network 562. Transport network 562 may use one or more transport protocols and may be a wired network, a wireless network, a cloud network, a local area network, a metropolitan area network, a wide area network, a public network, a private network, and the like.

Enterprise resources 504 may include email servers, file sharing servers, SaaS applications, web application servers, Windows application servers, and the like. Email servers may include Exchange® servers, Lotus Notes® servers, and the like. File sharing servers may include ShareFile® servers, and the like. SaaS applications may include Salesforce, and the like. Windows application servers may include any application server that is built to provide applications that are intended to run on a local Windows operating system, and the like. Enterprise resources 504 may be premise-based resources, cloud-based resources, and the like. Enterprise resources 504 may be accessed by mobile device 502 directly or through access gateway 560. Enterprise resources 504 may be accessed by mobile device 502 via transport network 562.

Enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on mobile device 502, by enterprise resources 504, and the like. The certificates stored on mobile device 502 may be stored in an encrypted location on mobile device 502, or the certificate may be temporarily stored on mobile device 502 for use at the time of authentication. Threat detection services 564 may include intrusion detection services, unauthorized access attempt detection services, and the like. Unauthorized access attempt detection services may include detection, mitigation, and/or prevention of unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

Enterprise mobility technical architecture 500 may include application store 578 (also referred to as an "app store"). Application store 578 may include unwrapped applications 580, pre-wrapped applications 582, and the like. Applications may be populated in application store 578 from application controller 574. Application store 578 may be accessed by mobile device 502 through access gateway 560, through the public Internet 548, or the like. Application store 578 may be provided with an intuitive and easy to use user interface.

Software development kit 584 may provide a user the capability to secure applications selected by the user by wrapping the application as described previously in this description. An application that has been wrapped using software development kit 584 may then be made available to mobile device 502 by populating it in application store 578 using application controller 574.

Enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

FIG. 7 is another illustrative enterprise mobility management system 600. Some of the components of mobility management system 500 described above with reference to FIG. 5 have been omitted for the sake of simplicity. The architecture of system 600 depicted in FIG. 6 is similar in many respects to the architecture of system 500 described above with reference to FIG. 5 and may include additional features not mentioned above.

Enrolled mobile device 602 may include client agent software 604, which interacts with gateway server 606, which may include gateway services, such as Citrix Gateway Service® developed by Citrix Systems, Inc. of Ft. Lauderdale, Fla., and application controller functionality) to access various enterprise resources 608 and services 609, such as Exchange®, SharePoint®, public-key infrastructure (PKI) resources, Kerberos resources, certificate issuance service. Although not specifically shown, mobile device 602 may also interact with an enterprise application store (e.g., StoreFront® developed by Citrix Systems, Inc. of Ft. Lauderdale, Fla.) for the selection and downloading of applications.

Client agent 604 may act as the UI intermediary for Windows apps/desktops, which are hosted in an Enterprise data center and accessed using, for example, the High-Definition User Experience (HDX)/Independent Computing Architecture (ICA) display remoting protocol developed by Citrix Systems, Inc. of Ft. Lauderdale, Fla. Client agent 604 also supports the installation and management of native applications on mobile device 602, such as native iOS® or Android® applications. For example, managed applications 610 (mail, browser, wrapped application) shown in the figure above may all be native applications that execute locally on mobile device 602. Client agent 604 and application management framework of this architecture may act to provide policy-driven management capabilities and features such as connectivity and SSO to enterprise resources/services 608. Client agent 604 may handle primary user authentication to the enterprise, for example, to gateway services 607 of gateway server 606 with SSO to other gateway server components. Client agent 604 may obtain policies from gateway server 606 to control the behavior of managed applications 610 on mobile device 602.

The secure interprocess communication (IPC) links 612 between native applications 610 and client agent 604 may represent a management channel, which may allow client agent 604 to supply policies to be enforced by application management framework 614 "wrapping" each application. IPC channel 612 may also allow client agent 604 to supply credential and authentication information that enables connectivity and SSO to enterprise resources 608. Finally, IPC channel 612 may allow application management framework 614 to invoke user interface functions implemented by client agent 604, such as online and offline authentication.

Communications between client agent 604 and gateway server 606 may be an extension of the management channel from application management framework 614 wrapping each native managed application 610. Application management framework 614 may request policy information from client agent 604, which in turn may request it from gateway server 606. Application management framework 614 may request authentication, and client agent 604 may log into gateway services 607 (e.g., Citrix Gateway Service® developed by Citrix Systems, Inc. of Ft. Lauderdale, Fla.). Client agent 604 may also call supporting services on gateway server 606, which may produce input material to derive encryption keys for local data vaults 616, or may provide client certificates, which may enable direct authentication to PKI protected resources, as more fully explained below.

In more detail, application management framework 614 "wraps" each managed application 610. This may be incorporated via an explicit build step, or via a post-build processing step. Application management framework 614 may "pair" with client agent 604 on first launch of application 610 to initialize secure IPC channel 612 and obtain the policy for that application. Application management framework 614 may enforce relevant portions of the policy that apply locally, such as the client agent login dependencies and some of the containment policies that restrict how local OS services may be used, or how they may interact with managed application 610.

Application management framework 614 may use services provided by client agent 604 over secure IPC channel 612 to facilitate authentication and internal network access. Key management for private and shared data vaults 616 (containers) may be also managed by appropriate interactions between managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through gateway services 607. Application management framework 614 may be responsible for orchestrating the network access on behalf of each managed application 610. Client agent 604 may facilitate these network connections by providing suitable time-limited secondary credentials obtained following online authentication. Multiple modes of network connection may be used, such as reverse web proxy connections and end-to-end VPN-style secure network tunnels 618.

Mail and browser managed applications 610 may have special status and make use of facilities that might not be generally available to arbitrary wrapped applications. For example, mail application 610 may use a special background network access mechanism that allows it to access Exchange server 608 over an extended period of time without requiring a full gateway service logon. Browser application 610 may use multiple private data vaults 616 to segregate different kinds of data.

This architecture may support the incorporation of various other security features. For example, gateway server 606 (including gateway services 607) in some cases may not need to validate active directory (AD) 622 passwords. It can be left to the discretion of an enterprise whether an AD password may be used as an authentication factor for some users in some situations. Different authentication methods may be used if a user is online or offline (e.g., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of data vaults 616 (containers) on mobile device 602. Vaults 616 may be encrypted so that all on-device data including files, databases, and configurations are protected. For online vaults, the keys may be stored on the server (gateway server 606), and for offline vaults, a local copy of the keys may be protected by a user password or biometric validation. If or when data is stored locally on mobile device 602 in secure container 616, it may be preferred that a minimum of AES 256 encryption algorithm be utilized.

Other secure container features may also be implemented. For example, a logging feature may be included, wherein security events happening inside managed application 610 may be logged and reported to the backend. Data wiping may be supported, such as when managed application 610 detects tampering or when requested by a user, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on mobile device 602 is generated using a passphrase or biometric data supplied by the user (if offline access is required). It may be XORed with another key randomly generated and stored on the server side if offline access is not required. Key derivation functions may operate such that keys generated from the user password use key derivation functions (KDFs), such as Password-Based Key Derivation Function 2 (PBKDF2), rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication-then-decryption may be used, wherein application data is decrypted only after the user has authenticated within the application. Another feature may relate to sensitive data in memory, which may be kept in memory (and not in disk) only when it is needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity (e.g., lack of user input), a user session is terminated.

Data leakage from application management framework 614 may be prevented in other ways. For example, if managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of one-time password (OTP) 620 without the use of AD 622 password for access to one or more applications. In some cases, some users may not know (or are not permitted to know) their AD password, and these users may thus authenticate using OTP 620 such as by using a hardware OTP system, such as RSA SecurID®, Entrust®, Gemalto®, and others. In some cases, after a user authenticates with a user ID, a text may be sent to the user with OTP 620. In some cases, this may be implemented only for online use, with a prompt being a single field.

An offline password may be implemented for offline authentication for those managed applications 610 for which offline use is permitted via enterprise policy. For example, an enterprise may want an enterprise application store, such as StoreFront, to be accessed in this manner. In this case, client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client-side certificate for certain applications 610 as secondary credentials (for the purpose of accessing PKI protected web resources via the application management framework micro VPN feature). For example, managed application 610 may utilize such a certificate. In this case, certificate-based authentication, for example, using Exchange ActiveSync protocol, may be supported, wherein a certificate from client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

Client agent 604 and application management framework 614 may be enhanced to support obtaining and using client certificates for authentication to internal PKI-protected network resources. More than one certificate may be supported, such as to match various levels of security and/or separation requirements. The certificates may be used by mail and browser managed applications 610, and by any other wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS® keychain in each managed application 610 for each period of use. Application management framework client certificate support may use an HTTPS implementation with private in-memory key storage. The client certificate may not be present in the iOS® keychain and may not be persisted except potentially in "online-only" data value that is strongly protected.

Mutual SSL or Transport Layer Security (TLS) may also be implemented to provide additional security by requiring that mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates, for example, to constrained delegation in Citrix Gateway® developed by Citrix Systems, Inc. of Ft. Lauderdale, Fla., where Citrix Gateway® supports invoking Kerberos protocol transition so it can obtain and use Kerberos service tickets (subject to constrained delegation) in response to HTTP Negotiate authentication challenges. This mechanism may work in reverse web proxy mode (also known as corporate virtual private network (CVPN) mode), and when HTTP (but not HTTPS) connections are proxied in VPN and MicroVPN mode.

Another feature may relate to application container locking and wiping, which may automatically occur upon jailbreak or rooting detections, and occur as a pushed command from administration console, and may include a remote wipe functionality even when managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (e.g., OpenSSL®). Trusted managed applications 610 of an enterprise may be allowed to perform specific public key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

The following paragraphs (S1) through (S13) describe examples of systems and devices that may be implemented in accordance with the present disclosure.

(S1) A system may comprise a memory and a processor coupled to the memory and configured to receive a file on behalf of a network of devices, the network of devices including the computing device and configured to store the file; identify an edge device based on previous file downloads for a given pair of users, the edge device configured to enable download of a copy of the file to an endpoint device; and provide the copy of the file to the edge device before receipt of a request by the edge device from the endpoint device to download the copy of the file.

(S2) A system may be configured as described in paragraph (S1), and further includes: monitoring download activities for a set of edge devices; tracking download information including the number of downloads and date of each download to each edge device in the set of edge devices; and building a prediction model with the download information.

(S3) A system may be configured as described in paragraph (S2), wherein the download information further includes identities of sender-recipient pairs that uploaded and downloaded shared files.

(S4) A system may be configured as described in paragraph (S3), wherein the prediction model includes forecast values for each sender-recipient pair computed for each edge device used by the sender-recipient pairs.

(S5) A system may be configured as described in paragraph (S4), wherein the forecast values are determined with an exponential moving average algorithm.

(S6) A system may be configured as described in paragraphs (S4)-(S5), wherein the at least one edge device is identified during a peer-to-peer file share between a current sender-recipient pair by detecting forecast values above a threshold for each edge device previously used by the current sender-recipient pair.

(S7) A system may be configured as described in paragraphs (S4)-(S6), wherein the at least one edge device is identified during a group file share between a sender and a group of recipients by summing forecast values for each edge device used by the sender-recipient pairs, and detecting summed forecast values above a threshold.

The following paragraphs (M1) through (M7) describe examples of methods that may be implemented in accordance with the present disclosure.

(M1) A method may involve receiving a file on behalf of a network of devices, the network of devices including the computing device and configured to store the file; identifying an edge device based on previous file downloads for a given pair of users, the edge device configured to enable download of a copy of the file to an endpoint device; and providing the copy of the file to the edge device before receipt of a request by the edge device from the endpoint device to download the copy of the file.

(M2) A method may be provided as described in paragraph (M1), and further includes: monitoring download activities for a set of edge devices; tracking download information including the number of downloads and date of each download to each edge device in the set of edge devices; and building a prediction model with the download information.

(M3) A method may be provided as described in paragraph (M2), wherein the download information further includes identities of sender-recipient pairs that uploaded and downloaded shared files.

(M4) A method may be provided as described in paragraph (M3), wherein the prediction model includes forecast values for each sender-recipient pair computed for each edge device used by the sender-recipient pairs.

(M5) A method may be provided as described in paragraph (M4), wherein the forecast values are determined with an exponential moving average algorithm.

(M6) A method may be provided as described in paragraphs (M4)-(M5), wherein the at least one edge device is identified during a peer-to-peer file share between a current sender-recipient pair by detecting forecast values above a threshold for each edge device previously used by the current sender-recipient pair.

(M7) A method may be provided as described in paragraphs (M4)-(M6), wherein the at least one edge device is identified during a group file share between a sender and a group of recipients by summing forecast values for each edge device used by the sender-recipient pairs, and detecting summed forecast values above a threshold.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computing device, comprising:
a memory; and
a processor coupled to the memory and configured to:
receive a file on behalf of a network of devices, the network of devices including the computing device and configured to store the file;
identify an edge device with a prediction model based on previous file sharing between pairs of users, the edge device configured to enable download of a copy of the file to an endpoint device; and
provide the copy of the file to the edge device before receipt of a request by the edge device from the endpoint device to download the copy of the file,
wherein the prediction model is built by monitoring download activities for a set of edge devices, tracking download information including a number of downloads and date of each download to each edge device in the set of edge devices, and building the prediction model with the download information.

2. The computing device of claim 1, wherein the download information further includes identities of sender-recipient pairs that uploaded and downloaded shared files.

3. The computing device of claim 2, wherein the prediction model includes forecast values for each sender-recipient pair computed for each edge device used by the sender-recipient pairs.

4. The computing device of claim 3, wherein the forecast values are determined with an exponential moving average algorithm.

5. The computing device of claim 3, wherein the at least one edge device is identified during a peer-to-peer file share between a current sender-recipient pair by detecting forecast values above a threshold for each edge device previously used by the current sender-recipient pair.

6. The computing device of claim 3, wherein the at least one edge device is identified during a group file share between a sender and a group of recipients by summing forecast values for each edge device used by the sender-recipient pairs, and detecting summed forecast values above a threshold.

7. A method of processing shared files, comprising:
receiving a file on behalf of a network of devices, the network of devices configured to store the file;
identifying an edge device with a prediction model based on previous file sharing between sets of users, the edge device configured to enable download of a copy of the file to an endpoint device; and
providing the copy of the file to the edge device before receipt of a request by the edge device from the endpoint device to download the copy of the file,
wherein the prediction model is built by monitoring download activities for a set of edge devices, tracking download information including a number of downloads and date of each download to each edge device in the set of edge devices, and building the prediction model using the download information.

8. The method of claim 7, wherein the download information further includes identities of sender-recipient pairs that uploaded and downloaded files.

9. The method of claim 8, wherein the prediction model includes forecast values for each sender-recipient pair computed for each edge device used by the sender-recipient pairs.

10. The method of claim 9, wherein the forecast values are determined with an exponential moving average algorithm.

11. The method of claim 9, wherein the at least one edge device is identified during a peer-to-peer file share between a current sender-recipient pair by detecting forecast values above a threshold for each edge device previously used by the current sender-recipient pair.

12. The method of claim 9, wherein the at least one edge device is identified during a group file share between a sender and a group of recipients by summing forecast values for each edge device used by the sender-recipient pairs, and detecting summed forecast values above a threshold.

13. A file sharing service, comprising:
a memory; and
a processor coupled to the memory and configured to process shared files in a distributed storage system according to a method that includes:
detecting an upload of a file from a first endpoint device into the distributed storage system;
identifying at least one edge device outside of the distributed storage system predicted to service a download request using a prediction model, wherein the prediction model is based on prior file sharing between users, wherein the prediction model is built by monitoring download activities for a set of edge devices, tracking download information including a number of downloads and date of each download to each edge device in the set of edge devices, and building the prediction model using the download information; and
instructing the distributed storage system to replicate the file onto the at least one edge device before the download request is received.

14. The file sharing service of claim 13, wherein the download information further includes identities of sender-recipient pairs that uploaded and downloaded a file.

15. The file sharing service of claim 14, wherein the prediction model includes forecast values for each sender-recipient pair computed for each edge device used by the pair.

16. The file sharing service of claim 15, wherein the forecast values are determined with an exponential moving average algorithm.

17. The file sharing service of claim 15, wherein the at least one edge device is identified during a peer-to-peer file share between a current sender-recipient pair by detecting forecast values above a threshold for each edge device previously used by the current sender-recipient pair.

* * * * *